United States Patent [19]

Struger

[11] Patent Number: 4,691,296
[45] Date of Patent: Sep. 1, 1987

[54] METHOD AND APPARATUS FOR EXCHANGING MULTIPLE DATA BYTES WITH AN I/O MODULE IN A SINGLE SCAN.

[75] Inventor: Odo J. Struger, Chagrin Falls, Ohio

[73] Assignee: Allen-Bradley Company, Inc., Milwaukee, Wis.

[21] Appl. No.: 672,457

[22] Filed: Nov. 16, 1984

[51] Int. Cl.⁴ ............................................. G05B 11/01
[52] U.S. Cl. ..................................................... 364/900
[58] Field of Search ................ 364/200, 900, 140, 141

[56] References Cited

U.S. PATENT DOCUMENTS 4,250,563  2/1981  Struger .................................. 364/900
4,413,319  11/1983  Schultz et al. ........................ 364/200
4,473,877  9/1974  Tulk ....................................... 364/200

*Primary Examiner*—Archie E. Williams, Jr.
*Assistant Examiner*—Michael J. Ure

*Attorney, Agent, or Firm*—Quarles & Brady

[57] ABSTRACT

In a programmable controller, addresses for a group of input/output modules are decoded to generate an enable signal to each respective module. To increase the density of I/O circuits per module without increasing the width of the data bus, the I/O modules are provided with enabling circuits that are responsive to a pair of associated enabling signals in one method of I/O scanning and responsive to an enabling signal and two or more byte addresses received in another method of I/O scanning. Circuit paths have been added on a backplane circuit board to allow each enable signal to be coupled to a pair of I/O modules in the first method of I/O scanning. In the second method of I/O scanning, the hardware for carrying out the first method is disabled and byte addresses are used to couple multiple bytes of I/O status to each I/O module.

11 Claims, 12 Drawing Figures

INPUT / OUTPUT SCAN

METHOD AND APPARATUS FOR EXCHANGING MULTIPLE DATA BYTES WITH AN I/O MODULE IN A SINGLE SCAN.

BACKGROUND OF THE INVENTION

1. Field of the Invention

The invention relates to digital controllers that are used to control industrial machines and processes.

2. Description of the Prior Art

A programmable controller for controlling industrial machines and processes typically has a main processor and a group of input and output (I/O) interface modules. The I/O modules are mounted in slots in an equipment rack. There is a slot at the left end of the rack for receiving either a processor module or an adapter module which communicates with a main processor unit. These two processor arrangements are shown and described in Struger, U.S. Pat. No. 4,250,563, issued Feb. 10, 1981. There, the separate main processor unit is located relatively close to the equipment rack, but with the use of a serial data link the equipment rack can be located remotely from the main processor unit as described in Schultz et al, U.S. Pat. No. 4,413,319, issued Nov. 1, 1983.

The I/O modules contain either a group of output circuits or a group of input circuits. The circuits are connected through terminals on the front of the rack and through external wiring to input and output devices on a machine or process. Typical output devices are solenoids, relays and motor starters. Typical input devices are limit switches, photoelectric sensors and proximity sensors.

An output circuit generates the proper AC or DC signal to operate an output device in response to an individual bit of status data. An input circuit responds to an AC or DC signal from an input device to generate an individual bit of status data. By including eight discrete input circuits in a single input module, data is collected from individual I/O devices and assembled into an eight-bit word of data, or "byte". Similarly, by including eight discrete output circuits in a single output module, bits of data can be distributed from data bytes to operate individual output devices.

The bytes of input and output data are stored in a main memory in the main processor, so that the status of I/O devices can be examined and controlled through execution of a control program. The bytes of input data are stored at a block of addresses in the main memory referred to as the input image table. The bytes of output data are stored at a block of addresses in the main memory referred to as the output image table.

A basic assumption underlying the design of presently available controllers, which allows the user to choose either an input module or an output module for any slot, is that one addressable location in the input image table and one addressable location in the output image table are reserved for handling data associated with each I/O module. When data is transferred between the main processor and the I/O modules during an input/output scanning operation, each slot is scanned twice, once to write a byte of output data to the module, if it was an output module, and once to read a byte of input data from the module, if it is an input module. In each scanning operation, one of these operations is a "dummy" or ineffective operation and one of the two lines of memory associated with the I/O module is not utilized.

In Schultz et al, U.S. Pat. No. 4,413,319, mentioned above, a concept of complementary inputs and outputs was described, where a first rack of output modules and a second rack of input modules were related to the areas in the two image tables that were previously reserved for a single such rack. A single rack of the prior art could hold up to sixteen I/O modules with eight circuits each for handling a total of one hundred twenty-eight I/O devices. By adding a second rack and by using the concept of complementary inputs and outputs, another one hundred twenty-eight I/O devices could be accommodated. While the use of complementary I/O racks would more fully utilize the main memory, it would have no effect on the physical density of I/O circuits in either the individual I/O modules or in a full I/O rack.

To make higher density I/O modules commercially practical, they should be interchangeable with the I/O modules of the prior art in an equipment rack occupying generally the same space and the same general configuration of previous I/O racks. In existing I/O systems, I/O addresses are decoded by the module in the left-most slot in the I/O interface rack, and the decoded signals are transmitted on sixteen enable lines in a backplane circuit board to sixteen respective I/O slots in the rack. When a module in a slot has been enabled, I/O status data is transmitted through an eight-bit I/O data bus in the backplane circuit board.

Assuming that the density of I/O circuits on the I/O modules could be increased from eight to sixteen, there are several technical problems. The first is that two bytes of data must be transferred for each I/O module without substantially changing the I/O scanning operation of existing main processors and without substantially altering the signal protocol along the backplane circuit board. Second, it would be desirable to provide a new scanning technique to overcome these limitations when the new I/O modules are used with newly developed processors. And third, it would further be desirable to allow customers the option of using the higher density I/O modules with either existing processors or the newly developed processors. It is in this environment that the present invention has been made.

SUMMARY OF THE INVENTION

The invention resides in two alternative methods of I/O scanning and in the backplane circuit board and I/O modules that are operable with these methods.

The first method is directed to eliminating "dummy" operations during the input/output scanning operation of the main processor. Existing processors will attempt to enable each I/O module once during an output sequence of the input/output scanning operation and once during an input sequence of the input/output scanning operation. In the prior art, enabling signals for both sequences were transmitted through a single enable line. The invention now provides an I/O module that is responsive to a pair of associated, but different, enabling signals. By cross-connecting the enabling lines for an associated pair of I/O modules, each module can be enabled twice during either the output sequence of the input sequence of the input/output scanning operation.

Each module, in effect, borrows an enabling signal from its neighboring module during the scanning sequence corresponding to its character as an input or output module. During the complementary sequence, the borrowing module lends its enable signal to its neighbor as a second enabling signal for the neighboring I/O module. The result is that for a byte-wide data bus, two bytes of data of data can be coupled to or from each I/O module provided that the modules are complementary—one being an output module and the other being an input module.

The second method provides a scanning technique that is a departure from that used by existing processors. A basic assumption in existing equipment is that binary-coded slot addresses are decoded by the processor or an adapter module to activate individual slot enable lines running to the respective slots. This solved a problem in computer I/O equipment in which an address bus ran across the backplane. Such an arrangement would have required decoding of slot addresses by each I/O module in programmable controller equipment.

In the second method of the invention signals are generated on binary-coded byte address lines which have been added to the backplane circuit board. Signals are transmitted on these lines to transfer a sequence of eight bytes of data to or from a single I/O module in a single slot.

A further aspect of the invention involves a control line, dubbed the "ALEX" line, which has been provided to signal the I/O module when the second scanning technique is being used. The I/O module is provided with circuitry that is responsive to the ALEX signal to enable the byte addressing or byte selector lines and to disable the cross-signalling of enable signals used in the first scanning technique mentioned above.

One object of the invention is to increase the density of I/O circuits while maintaining the size of the I/O modules containing those circuits.

Another object of the invention is to provide higher capacity I/O modules which are interchangeable with the conventional eight-bit capacity I/O modules and which are compatible with presently available processors.

To be able to insert the higher capacity I/O modules in slots designed for the eight-bit capacity I/O modules, the backplane logic circuitry in the higher capacity I/O modules has been made responsive to two different slot enabling signals. The prior modules were responsive to only one enabling signal.

The additional enabling signals are provided—without changing the signal protocol of processors—by modifying the backplane circuit board. Each enabling signal is effectively split into two signals, one of which becomes available to an adjacent and complementary slot in the equipment rack.

Another object of the invention is to more fully utilize the portions of memory that are used for storage of input and output image tables. The invention allows the lines of memory formerly reserved for two eight-bit I/O modules to be used for two sixteen-bit I/O modules. Normally, an increase in I/O capacity would require an increase in the area of memory reserved for status data, but with the invention, this is not necessary.

Another object of the invention is to overcome the limitation of complementary distribution of higher density input and output modules which is present when existing processors are used. Therefore, the invention provides a new I/O scanning technique and circuitry for I/O modules that is responsive to signals generated with this new method of I/O data transfer.

These and the other objects and advantages of the invention will become apparent from the following description and from the drawings, which form a part hereof and which are referred to in the description. The drawings and description disclose a preferred embodiment—by way of an example of the invention. Such embodiment does not, however, represent the full scope of the invention, which is instead defined by the claims that follow the description.

DETAILED DESCRIPTION OF THE PREFERRED EMBODIMENT

Figure 1:
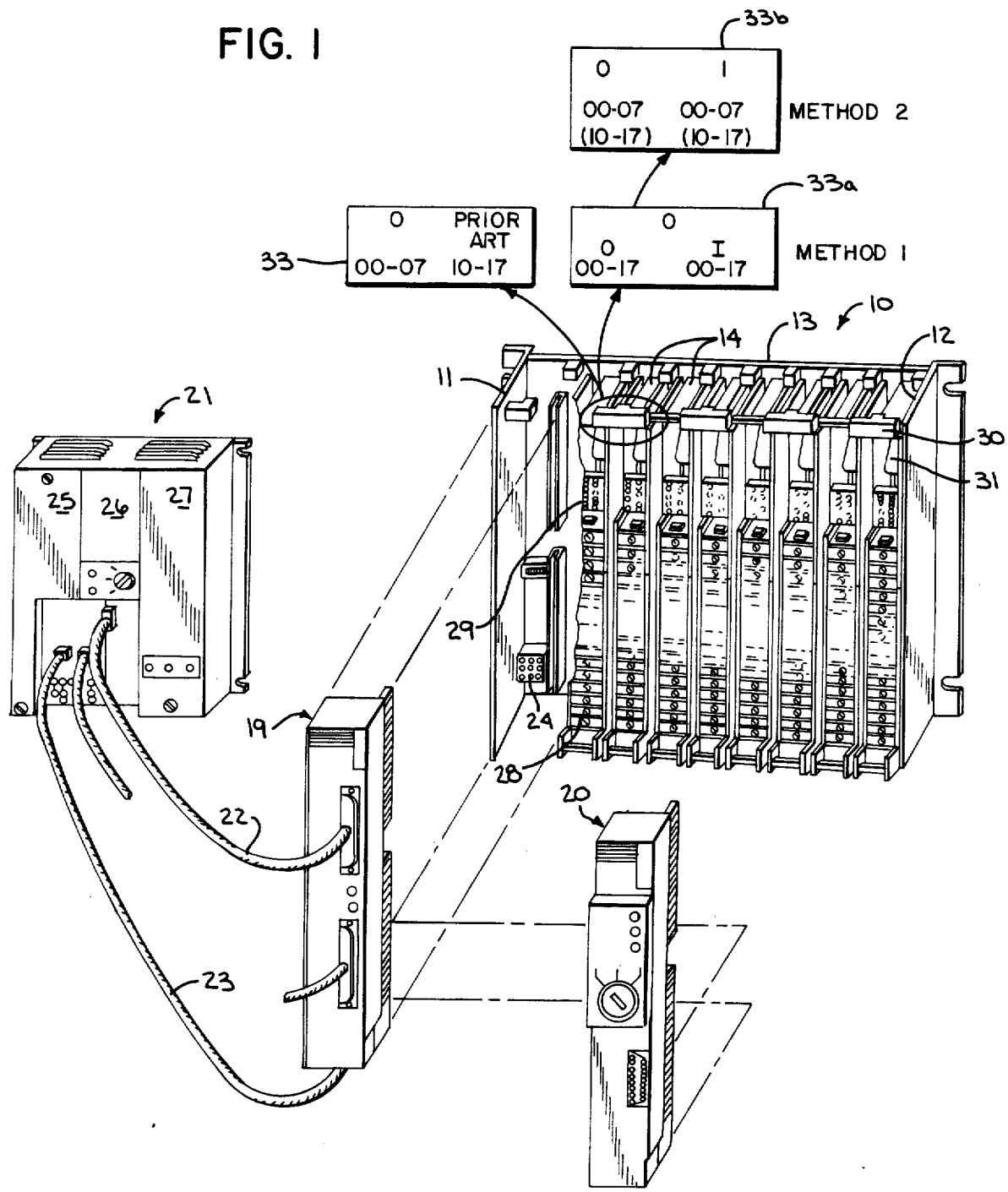
FIG. 1 shows two alternative programmable controller arrangements which use an equipment rack and I/O modules of the present invention.

FIG. 1 shows an equipment rack 10 which supports and connects a group of modular units in a programmable controller system. A backplane circuit board 13 extends across the back of the rack 10 from one sidewall 11 to the other 12. Slotted guide rails (which have been removed for viewing the backplane) normally extend from the front to the back and are arranged in pairs of upper and lower guide rails to receive the modular units in a side-by-side fashion.

The rack 10 holds a mix of input and output modules, known generically as I/O modules 14. These are plugged into physical locations referred to as slots, and more particularly are plugged into back edge connectors 15 and 16 seen in FIG. 2. The backplane circuit board 13 has circuit paths, which will be described more particularly below, and these circuit paths provide the electrical connection of the back edge connectors 15 and 16 to the back edge connectors 17 and 18 which are seen in the left-most slot of the rack in FIGS. 1 and 2. The module of FIG. 1 that plugs into this slot and into these back edge connectors 17 and 18 can be either an adapter module 19 or a processor module 20, depending on which one or two system arrangements from Struger, U.S. Pat. No. 4,250,563, is selected.

In the first system arrangement seen in FIG. 1, a separate processor unit 21 is connected by a communication cable 22 to the adapter module 19 and by a power cable 23 to a power connector 24 seen on the backplane circuit board 13 in FIG. 1. The separate processor unit 21 includes a power supply in its left one-third portion 25, a memory module in its middle portion 26, and a main processor in its right one-third portion 27. The memory module in this processor unit 21 can accommodate up to 8,096 (8k) 16-bit words of data. This capacity allows the separate processor unit 21 to manage I/O status data for I/O modules in several equipment racks 10 provided that each rack 10 includes an adapter module 19 coupled for communication with the processor unit 21. In a variation of this arrangement, the separate main processor 21 can be connected via a serial data link to control I/O modules in a multitude of equipment racks at remote and diverse locations.

In the second arrangement in FIG. 1, a processor module 20—of the size of the adapter module 19—is plugged into the left-most slot of the equipment rack 10. This provides a programmable controller system with a processor 20 and with I/O modules 14 in a single modular assembly. In this arrangement a power supply (not shown) would be mounted to the left sidewall 11 of the equipment rack 10. Here, the processor module 20 includes only as much memory as is needed to manage I/O data for the I/O modules 14 in its own equipment rack 10. This processor module 20 also incorporates, to the extent necessary, the functions of the adapter module 19 in the first arrangement.

As is known in the art of industrial control, the I/O modules 14 can be connected to input and output devices (not shown) on a controlled machine or assembly line (not shown). The input devices may be photocells, limit switches, proximity sensors or manually controlled pushbuttons and selector switches. The output devices may be solenoids, relays or various types of electrically actuated motor drives. These devices are connected by individual wires to the front edges of the I/O modules 14 through the swing arm, multi-terminal edge connectors 28 seen in FIG. 1. Each connector 28 has sixteen I/O terminals, four power terminals and one ground terminal, the faded out portion of FIG. 1 indicating the repeating pattern of the terminals. This allows sixteen input or output devices to be connected to each swing arm connector 28 as compared with the eight that could be connected to prior I/O modules. The density of wires is such that they are routed in a bundle running along the bottom front of the rack 10. The connectors 28 can be pulled forwardly and downwardly when it is desired to remove or insert an I/O module 14.

Just above the connectors 28 are groups of LED status indicators 29, which are part of the I/O modules 14, and which indicate the status of I/O devices controlled through the I/O modules 14. Above these indicators are a group of downwardly pivoting latches 30 which are mounted on an upper support rod and which engage lugs 31 on the I/O modules 14 to hold them in place while the connectors 28 are pulled forward. It is customary to provide labels 32, 33a and 33b on the front of these latches 30 to identify the respective I/O modules 14 below. Label 32 is a label used with I/O modules of the prior art, while labels 33a–33b are labels used with the present invention.

The function of the I/O modules 14 seen in FIG. 1 is to interface the input and output devices (hereafter "I/O devices") to the system processor 19 or 20. Various I/O devices may be used including those operating with DC signals of 10–60 DC volts or those operating with AC signals of 120 AC volts. Power for the I/O devices is supplied through the power terminals on the swing arm connector 28.

Whatever their operating voltage, the I/O devices are of the type in which a single operating signal can be converted to a single logic-level signal of 0–5 DC volts. Thus, the status of sixteen I/O devices having sixteen respective operating signals can be represented by sixteen logic-level DC signals. Each I/O module 14 is therefore connected to a number of such single-signal oriented I/O devices and provides the circuitry for relating the logic-level signals and corresponding operating signals. The connection of multiple I/O devices to a single I/O module allows the collection or assembly of sixteen input signals into two bytes of eight bits each, and the distribution of sixteen output signals from such bytes.

The digital signals or bits are transmitted back and forth between the I/O modules 14 and the system processor 19 or 20 through the backplane circuit board 13 and the connectors 15, 16, 17 and 18 that were described above. Such signals are referred to as status data because they represent the status or state of input devices as sensed by input circuits on the I/O modules. Such signals also represent the commanded status or state of the output devices to be obtained by actuating or deactuating the output devices.

Figure 4:
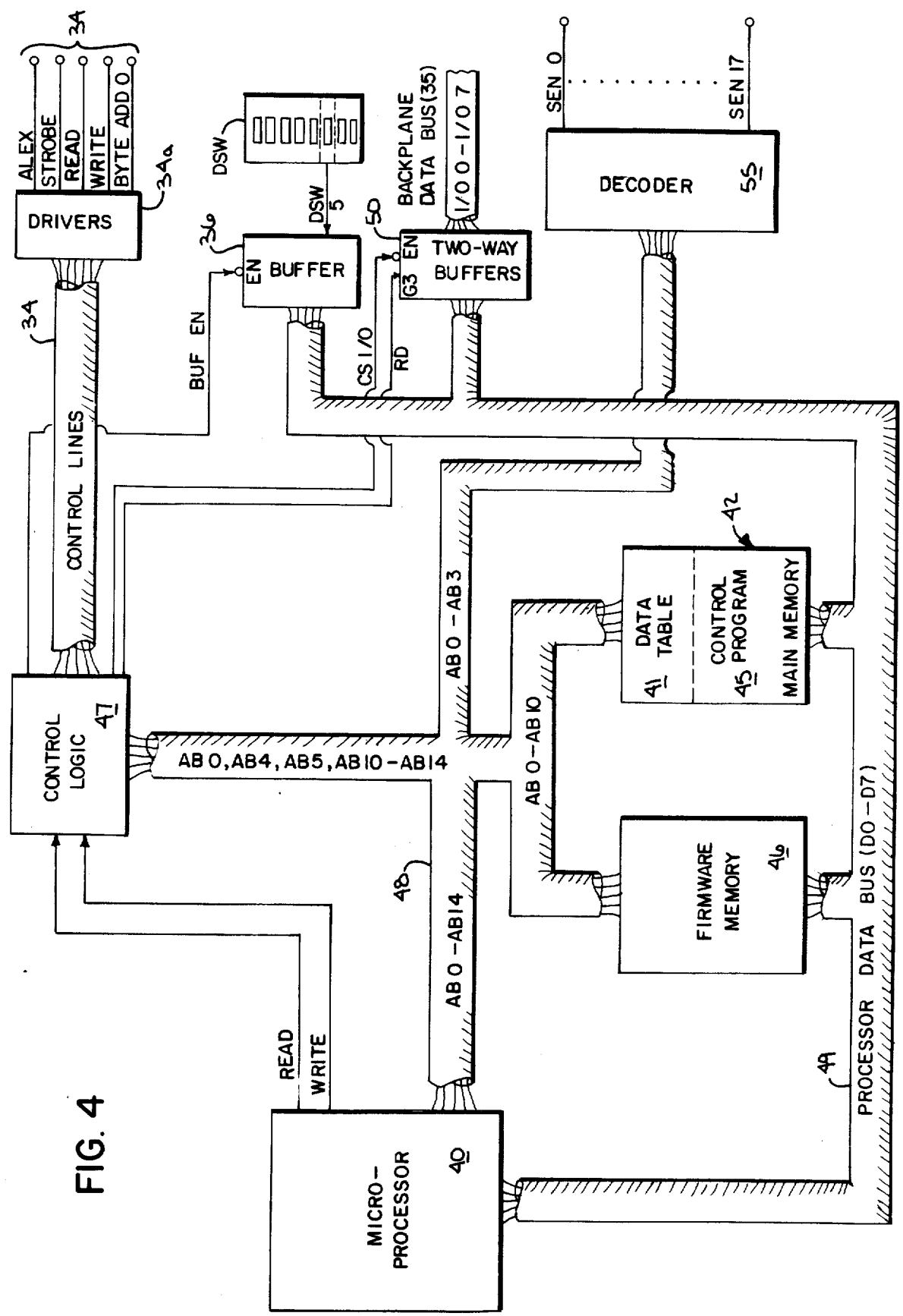
FIG. 4 is a block diagram of a processor module in FIG. 1 that fits into the left-most slot in the equipment rack.

Through the status data, the system processor 19 or 20 controls the I/O devices. Referring to FIG. 4, the system processor module 20 includes a microprocessor 40 which operates on I/O status data stored in a data table 41 in a main memory 42. The microprocessor 40 addresses the main memory 42 through lines AB-0–AB10 of an interconnecting address bus 48 and transfers data on lines D0–D7 of interconnecting data bus 49.

Figure 5:
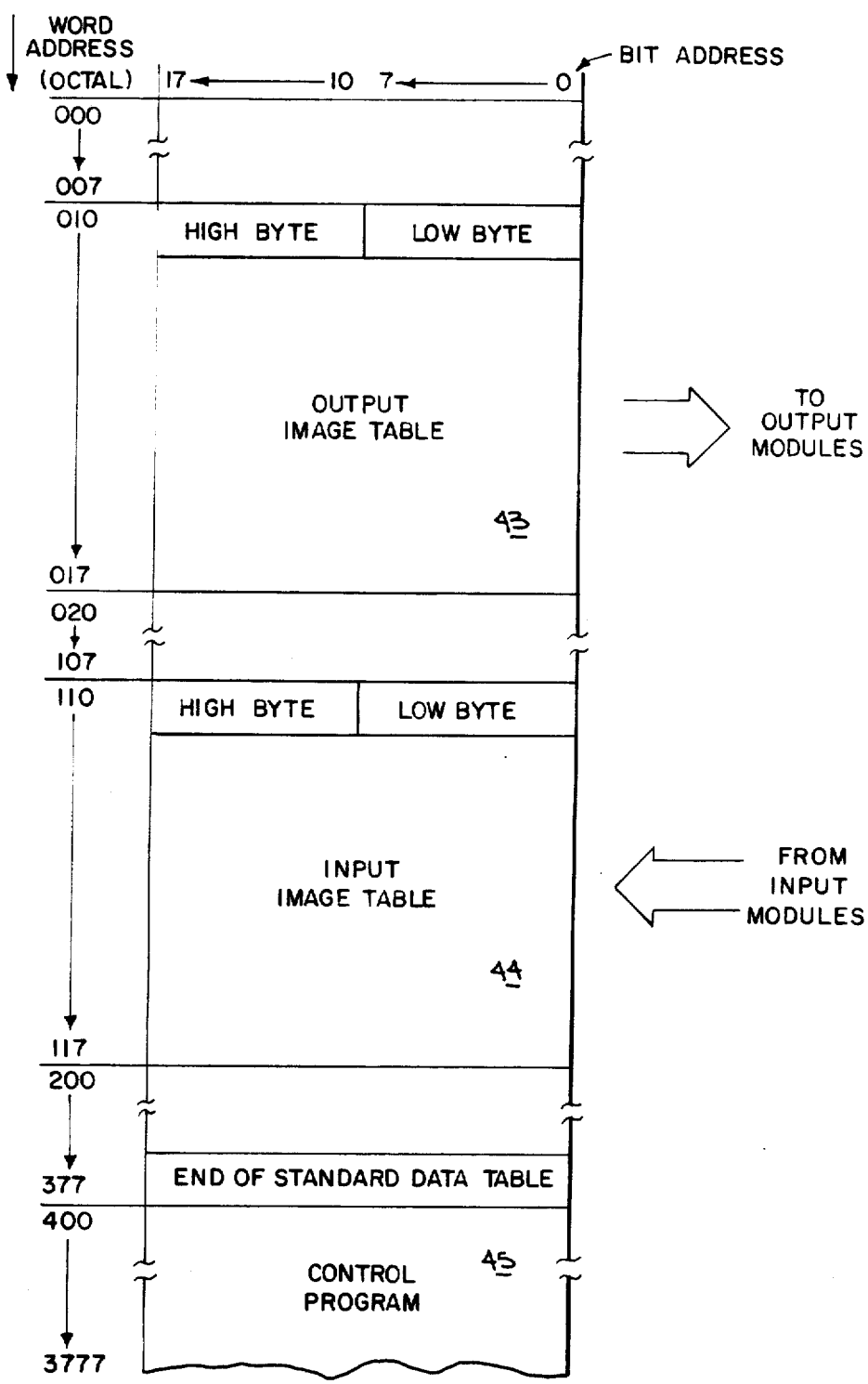
FIG. 5 is a map of the I/O data table stored in one of the memories in FIG. 4.

The data table 41 is seen in more detail in FIG. 5 and includes an output image table 43 at locations 010–017 (octal) and an input image table 44 at locations 110–117 (octal). As represented in FIG. 5, output status data is transmitted from the output image table 43 to the output modules and input status data is received into the input image table 44 from the input modules. Also stored in the main memory, beginning at location 400 (octal), is a user control program 45. This includes program instructions of a type that have been developed into a relatively standard set for industrial applications. Such instructions are represented by mnemonics such as XIC, XIO, OTE, BST, BND, GET, PUT, and TON 0.1 to name a few. Besides the mnemonic form, these instructions can also be displayed in a ladder diagram format, either on paper or on the screen of a CRT terminal.

The instructions in the control program 45 are not directly executed by the microprocessor 40 in FIG. 4, but are instead interpreted. This is an operation in which each type of control program instruction is linked to an interpreter routine which is stored in a firmware memory 46 in FIG. 4. The microprocessor 40 addresses the firmware memory 46 through lines AB-0–AB10 of interconnecting address bus 48 and reads program information on lines D0–D7 of interconnecting data bus 49. As explained more fully in Brown et al, U.S. Pat. No. 4,282,584, issued Aug. 4, 1981, the control program instructions in the main memory 42 form starting addresses in the firmware memory 46 where the routines begin. The routines of machine instructions in the firmware memory 46 are typically engineered by the manufacturer of the programmable controller and are not designed for alterntion by the user. Consequently, the firmware memory 46 is a programmed read-only memory (PROM) which provides non-volatile storage.

The execution of one cycle of the control program 45 results in the examination of input status data in the input image table 44 in FIG. 5 and the alteration or confirmation of output status data in the output image table 43. After each cycle of the control program, or "program scan", the microprocessor 40 in FIG. 4 executes other instructions in the firmware memory 46 which are part of an "I/O scan" routine. During the execution of this routine, input status data is received from the input modules and the input image table 44 is updated. Also, fresh output status data is sent to the output modules. Because the status data in the data table 41 is changed frequently, the main memory 42 in FIG. 4 is a random access memory (RAM) in which it is easier to alter data than in a PROM, for example.

In controlling data transfer to and from the I/O modules 14, the microprocessor 40 is assisted by a control logic circuit 47 seen in FIG. 4. This circuit 47 receives input signals on lines AB0, AB4-AB5 and AB10-AB14 of an address bus 48, and also receives input signals on READ and Write control lines from the microprocessor 40, and its responsive to generate signals on I/O control lines 34, such as the STROBE, READ, WRITE, ALEX and BYTE ADDRESS 0 line. These signals are transmitted through a set of drivers 34a to the backplane.

To address individual I/O modules, the microprocessor 40 transmits signals through lines AB0-AB3 of the address bus 48 to a decoder 55. The decoder 55 is a four line-to-sixteen line decoder which decodes binary signals on the four address lines to generate sixteen enable signals on lines SEN 0-SEN 17 (octal).

Data is transferred to and from the I/O modules 14 through the processor data bus 49, which is coupled through a set of two-way buffers 50 to lines I/O 0-I/O 7 in the backplane data bus 35. The buffers 50 are a set of bidirectional receiver/driver circuits through which signals are gated between the two data buses 49 and 35. The buffers 50 are activated by the microprocessor 40 through the control logic circuit 47 and through a CS · I/O enable line and the READ line.

Also seen in FIG. 4 is an input buffer 36 which couples data from a dip switch (DSW) to he processor data bus 39 when enabled through a BUF EN line running from the control logic circuit 47. The fifth switch element (DSW 5) selects the "ALEX" mode of operation in which the ALEX line is active. The microprocessor 40 executes an input instruction to read the switch setting and then executes a pump instruction that is conditioned on the state of the bit read from the dip switch (DSW). These instructions are preferably part of the I/O scan routine, but can also be included in an initialization routine if the status of the switch setting is continually maintained in the memory.

Figure 6:
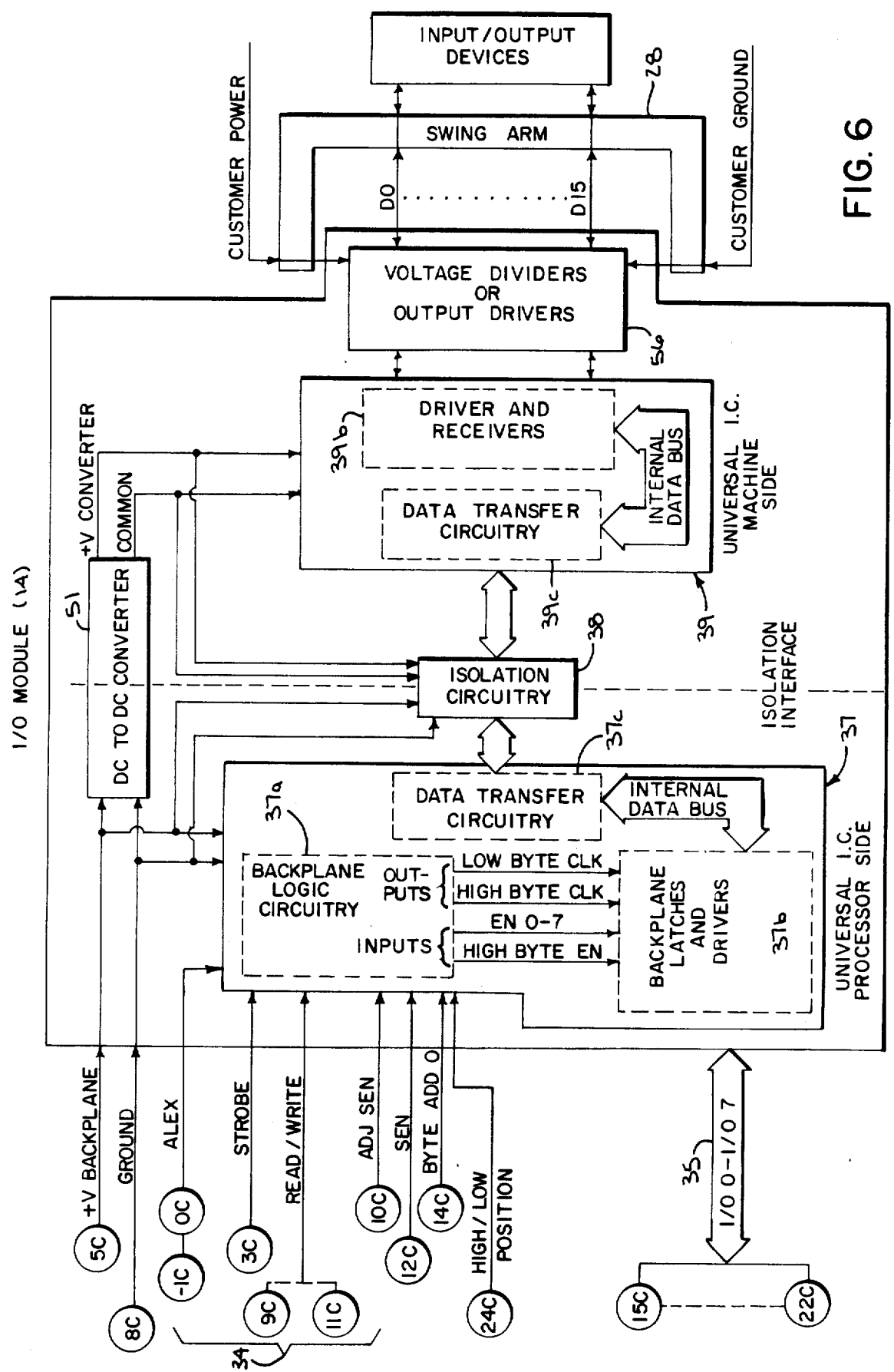
FIG. 6 is a block diagram of one of the I/O modules seen in FIG. 1.

A block diagram of one of the I/O modules is seen in FIG. 6. The front edge of the I/O module 14 is shown on the right where sixteen terminals D0-D15 (decimal) connect to the sixteen I/O terminals on one of the swing arm connectors 28. The back edge of the I/O module 14 is toward the left where the I/O control lines 34 and the I/O data bus lines I/O 0-I/O 7 are connected through pins (represented by circled numbers) on one of the backplane connectors 15 seen in FIG. 2.

Data transfer is controlled through the I/O control lines 34, including a STROBE line, a READ line or a WRITE line. Also seen are an ADJ SEN (adjacent slot enable) line, a SEN (slot enable) line and a HIGH/LOW POSITION line, which are used to activate the module when transfer is via a first I/O scanning technique, and a BYTE ADDRESS 0 line which is used with the SEN line to activate the module when data transfer is via a second scanning technique. Also seen is a line dubbed the ALEX line, which controls which scanning signals are recognized by the I/O module 14.

Figure 2:
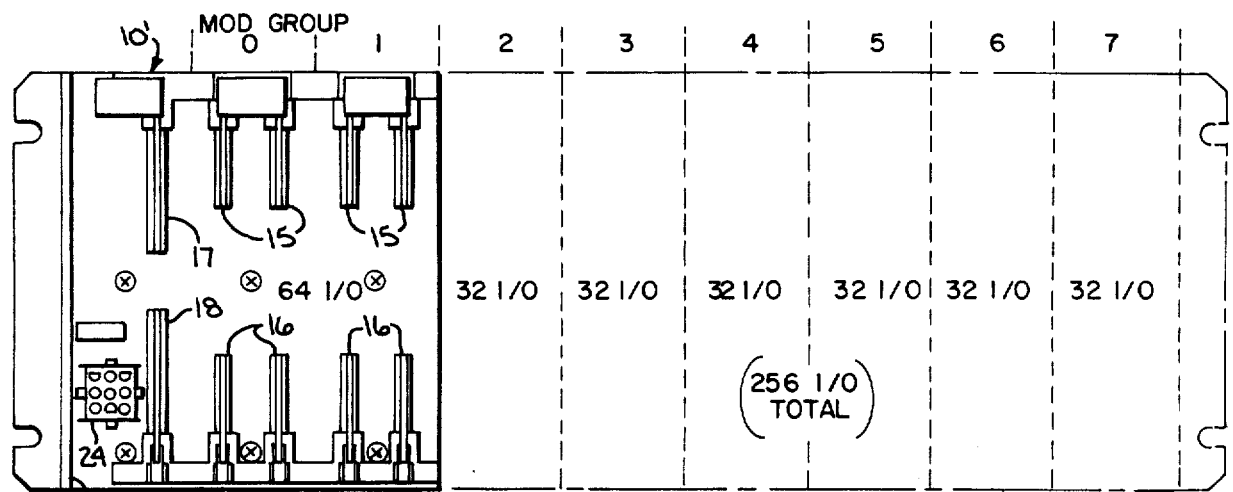
FIG. 2 is a front view of a portion of a larger-sized equipment rack of the invention, with the remainder being outlined in phantom.
Figure 3:
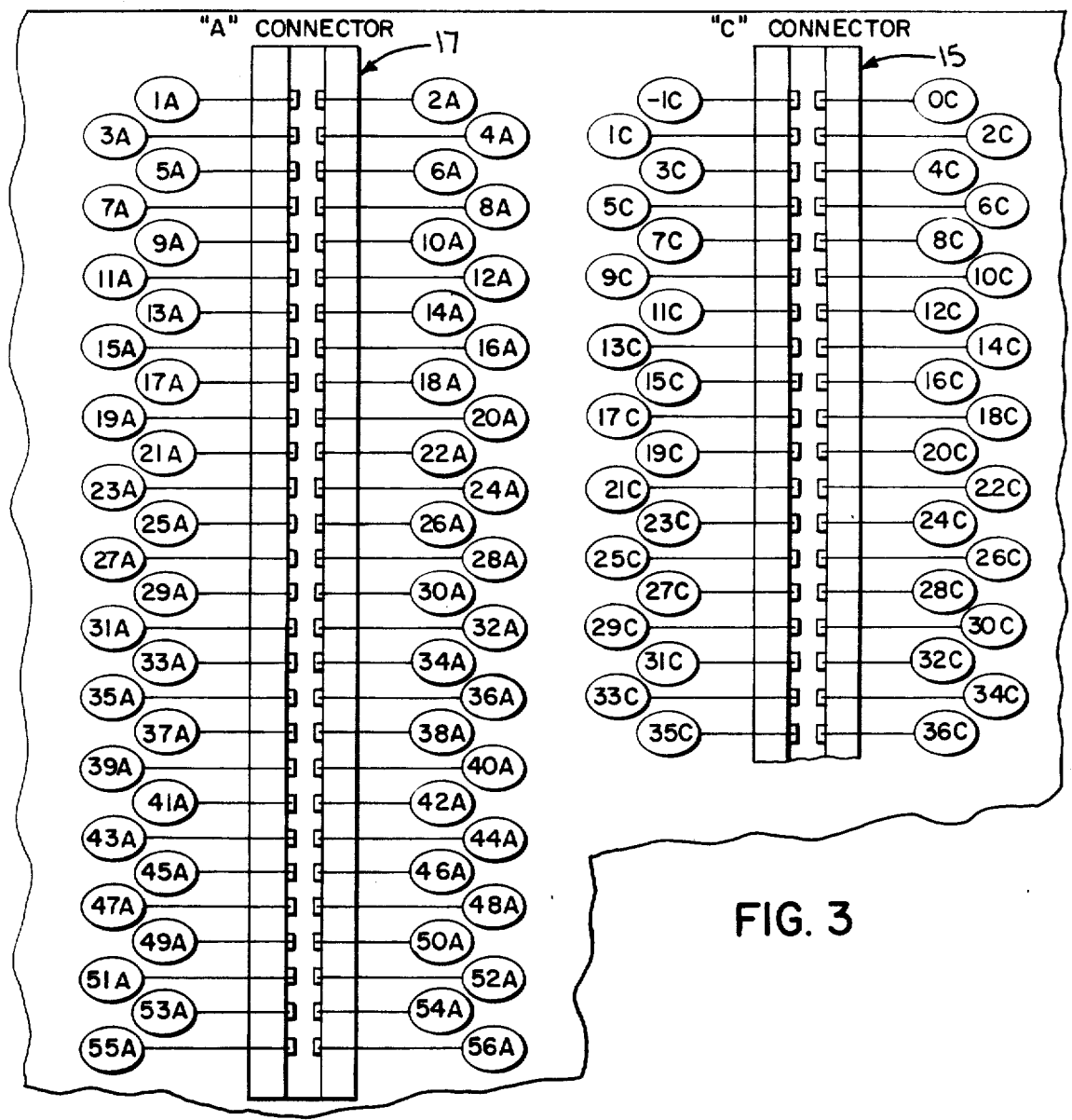
FIG. 3 is an enlarged detail view of the electrical connectors seen in the equipment racks of FIGS. 1 and 2.

The STROBE line is connected to "pin 3C", which is part of the backplane connector 15 seen in FIGS. 2 and 3. The READ line is connected to "pin 9C", and a WRITE line is connected to "pin 11C", but the I/O module 14 will connect only to one of these, according to whether it is an input module (READ) or an output module (WRITE). The ADJ SEN line is connected to "pin 10C" and the SEN line is connected to "pin 12C" of the backplane connector 15. The HIGH/LOW POSITION line is connected to "pin 24C". The BYTE ADDRESS 0 line is connected to "pin 14C" and the ALEX line is connected to "pin 0C" and to "pin –1C". The I/O module 14 transmits or receives I/O status data on lines I/O 0-I/O 7 of an eight-bit I/O data bus 35, which are connected to pins 15C-22C.

The I/O module 14 is divided into a processor side and a machine side by an isolation interface (dashed line). This interface is provided by optical coupling circuits in isolation circuitry 38, which is described in detail in the copending application of Maskovyak et al, entitled "Double Density I/O Modules With Universal Components" and filed on even date herewith. For the present invention, it is sufficient to know that this circuitry 38 couples data across the isolation interface between an integrated circuit 37 on the processor side and an integrated circuit 39 on the machine side.

The integrated circuit 37 on the processor side includes backplane logic circuitry 37a, which is connected to backplane latches and drivers 37b through a LOW BYTE CLK (low byte clock) line, a HIGH BYTE CLK (high byte clock) line, an EN 0-7 (enable input buffer) line and a HIGH BYTE EN (high byte enable) line. This circuitry 37a makes it possible to increase the transfer of I/O status data from eight bits to sixteen bits per module.

The backplane latches 37b are responsive to signals on the LOW BYTE CLK line and on the HIGH BYTE CLK line to receive first a low byte of "output" status data, and then a high byte of "output" status data. The terms "low" and "high" refer to the relative addresses associated with each pair of bytes in the image table of the processor main memory and also refer to the relative addresses of input/output devices. The backplane drivers 37b, on the other hand, are responsive to two successive signals on the EN 0-7 line to transmit low and high bytes of "input" status data through the backplane data bus 35. The HIGH BYTE EN line is used to steer the high byte of input status data from one of two multiplexing latches used to hold input status data. This line is needed to multiplex the low byte and the high byte of input status data through a common buffer.

The integrated circuit 37 on the processor side also includes data transfer circuitry 37c which transfers data to and from the backplane latches and drivers 37b and across the isolation interface.

On the machine side, the integrated circuit 39 includes data transfer circuitry 39c which cooperates with the data transfer circuitry 37c to transfer data across the isolation interface 38. This integrated circuit 39 also includes a group of machine side drivers and receivers 39b. Where the I/O module 14 is an input module, it is the receivers that are active, and when the I/O module 14 is an output module, it is the drivers that are active. The receivers 39b are connected to voltage dividers 56 when the I/O module 14 is an input module, and the drivers 39b are connected to output drivers 56, on the module but external to the integrated circuit 39, when the I/O module 14 is an output module. The interface circuitry 56 then connects through lines D0–D15 to corresponding data signal terminals on the swing arm connector 28.

Power is supplied to the circuitry 37, 38 on the processor side from pins 5C–8C on the backplane converter 14, while power to circuitry 38, 39 on the machine side is supplied across the isolation interface through a DC-to-DC converter 51.

Figure 7:
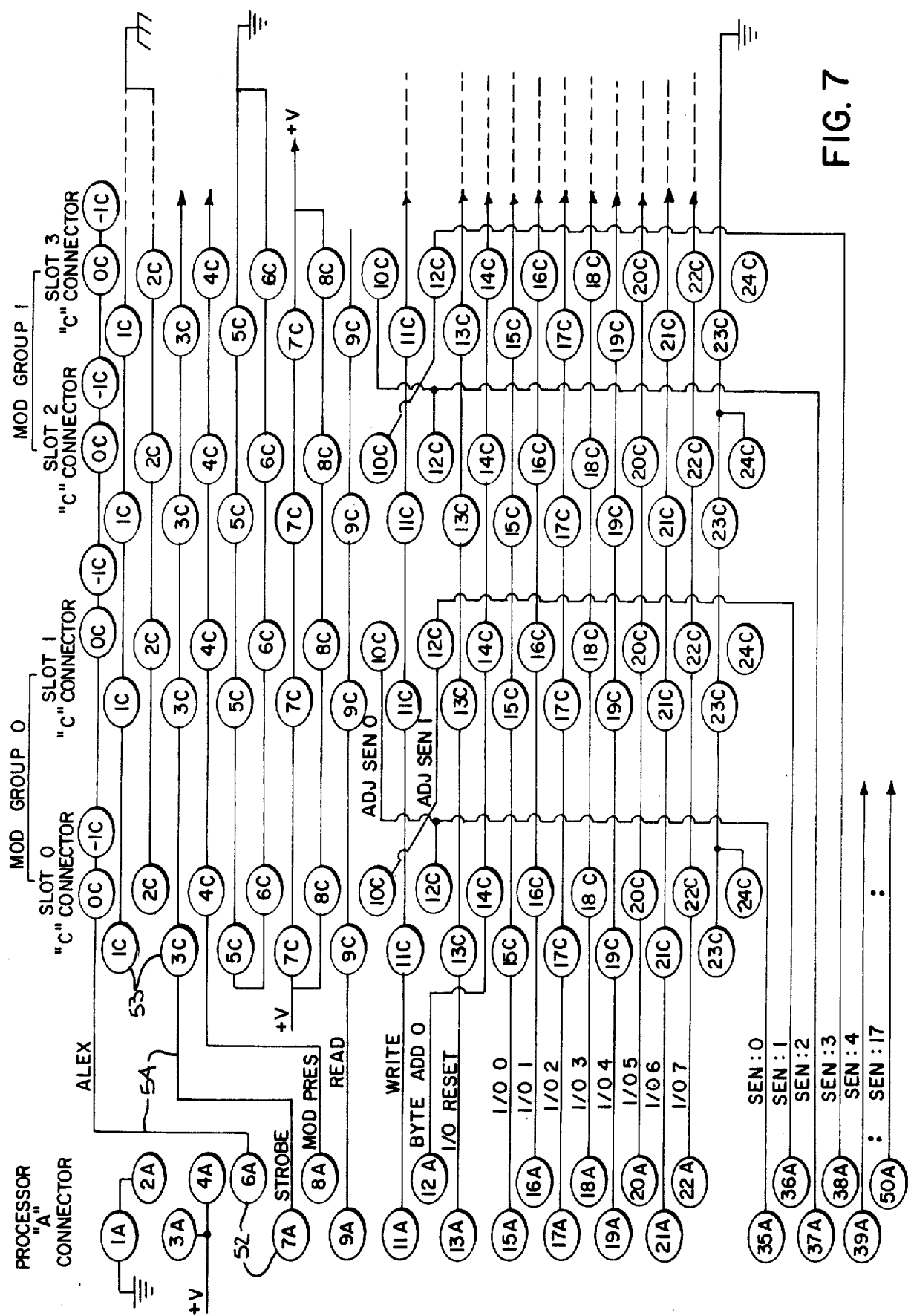
FIG. 7 is an electrical schematic diagram of connections made through a backplane circuit board included in the apparatus of FIGS. 1-3.

The connection of the I/O modules 14 through the backplane to the processor module 20 is seen in more detail in FIGS. 3 and 7. FIG. 3 shows the upper connector 17 from the left-most slot in FIG. 2, as well as the connector 15 next to it. The upper connector 17 is referred to as the "A" connector and there is only one of these. The upper connector 15 is referred to as the "C" connector, and there is one of these for each slot and each I/O module 14. The "A" connector 17 has fifty-six pins with designations 1A–56A. The "C" connectors 15 each have thirty-eight pins with designations 0C–36C, as well as −1C.

The connectors 15 and 17 in FIG. 3 are mounted on the backplane circuit board 13, which is represented schematically in FIG. 7. This circuit board 13 has sets of conductive terminals 52 and 53 which are formed with apertures to receive stabbing projections along the back of the connectors 15 and 17. These projections (not shown) are extensions of the pins in each connector 15 and 17. The terminals 52 and 53 are also formed of a conductive material and are interconnected by circuit paths of conductive material represented by the lines 54 in FIG. 7. The pattern of terminals 52 and 53 and conductive paths 54 can be transferred from a design drawing to the circuit board 13 using one of the many suitable techniques known in the art for making printed circuit boards. A photolithographic technique is preferred.

To adopt the notation used in the art, the terminals 52 and 53 in FIG. 7 have been identified according to the pin contacted in the "A" and "C" connectors 17 and 15, respectively, while the lines 54 have been identified according to the signals they carry. For example, the ALEX line runs from processor "pin 6A" to an I/O terminal and I/O "pins 0C and −1C". The STROBE line runs from processor terminal and processor "pin 7A" to an I/O terminal and I/O "pin 3C" in each slot. The READ line runs from processor terminal and processor "pin 9A" to an I/O terminal and I/O "pin 9C" in each slot. The WRITE line runs from processor terminal and processor "pin 11A" to an I/O terminal and I/O "pin 11C" in each slot. The BYTE ADDRESS 0 line runs from processor "pin 12A" to I/O terminal and I/O "pin 14C" in each slot. The I/O data bus lines I/O 0–I/O 7 run from processor terminals and processor "pins 15A–22A" to corresponding I/O terminals and "pins 15C–22C" in each slot. And, the slot enable lines SEN 0–SEN 17 each connect to an I/O terminal and I/O "pin 12C" in a single respective slot.

As seen in FIG. 4, the SEN signals originate from the decoder 55. Sixteen signal lines (numbered SEN 0–SEN 17 in octal notation) are needed to execute an I/O scanning operation for a full-size I/O rack 10' with sixteen slots as seen in FIG. 2. For convenience of the illustration, a half-sized rack 10 with eight I/O modules 14 is shown in FIG. 1. The large rack 10' of FIG. 2 could handle 128 I/O devices with the eight-bit I/O modules of the prior art. With the invention, this capacity is expanded to 256 I/O devices using sixteen-bit capacity I/O modules of the same physical size as the eight-bit I/O modules. It can further be expanded to 1,024 I/O using the second scanning method disclosed herein, provided that the density of I/O circuits can be increased to sixty-four per I/O module 14.

Referring again to FIG. 7, the first slot enable signal SEN 0 is received through processor terminal and pin 35A. The "processor terminal 35A" is connected by a respective one of the circuit paths 54 to "I/O terminal and pin 12C" in "slot 0" in the I/O rack 10 or 10'. In similar fashion, the second slot enable signal SEN 1 is received through processor terminal and pin 36A, and is coupled through another respective circuit path 54, labeled SEN 1, to I/O terminal and I/O "pin 12C" in "slot 1" of the I/O rack 10 or 10'. Similarly, the succeeding slot enable signals SEN 2–SEN 17 (octal) are coupled to "pin 12C" in the other respective slots.

According to the known I/O scanning operation of the processor module 20, I/O status data is transferred through lines I/O 0–I/O 7 seen in FIGS. 4 and 5 under the control of signals on the STROBE, READ, WRITE and SEN lines. The I/O scanning operation is divided into an input sequence and an output sequence, with the output sequence being executed first.

During the output sequence two SEN (slot enable) signals are coupled to two respective slots, each SEN signal being accompanied by a WRITE signal. When the appropriate SEN signal and the WRITE signal are present, data is present on lines I/O 0–I/O 7. During this period a 1-microsecond STROBE pulse is also generated as a timing signal to a latch on an I/O module. The latch then holds the data that was present on lines I/O 0–I/O 7.

During the input sequence, two SEN signals are coupled to the same respective slots, each SEN signal being accompanied by a a READ signal. When the appropriate SEN signal and READ signal are received, the I/O module couples input status data on the I/O data bus 35 to be read by the processor module 20.

Since the slots are tied to a common I/O data bus 35, only one I/O module can have access to the I/O data bus at any given time. The function of the SEN signals is to provide a sequence in which each I/O module has an unshared time for communication through the I/O data bus 35.

In the above-described I/O scanning operation, each I/O module 14 is enabled twice by a SEN signal on its corresponding SEN line, once during the output sequence and a second time during the input sequence. This allows a user of the equipment to place either an input module or an output module in any slot in the equipment rack 10 or 10'. The data for the module will be transferred during the appropriate sequence.

Referring next to the label 32 and 33a in FIG. 1 and to the labeling of the slots in FIG. 7, it will be seen that the I/O modules in slots "0" and "1" are grouped into "Module Group 0" for user programming purposes. When an I/O address is entered in a portion of a control program instruction, it is entered as a five-place octal number such as "010 07". The first zero signifies an output module. The "1" signifies rack 1. The next zero signifies "Module Group 0," and the last two numbers specify an exact bit within the I/O module being addressed.

The I/O addresses refer, in one sense, to addresses in the main memory 42 as seen in FIG. 5. The address "010 07" is located in the output image table at line 010 (octal), which is the eighth line of the memory 42. Each line of memory 42 stores sixteen bits of status data identified as bits 00-17 (octal). Thus, bit 07 is the upper bit in a "low byte" of output status data.

When the user program, through the execution of an OTE instruction, for example, directs an I/O device at address "010 07" to be turned on or energized, this direction is implemented by setting the status bit at location 010 07 in FIG. 5 to "1". When the I/O scanning operation is performed, the low byte in line 010 is coupled to the I/O data bus 35 in FIG. 5 through the processor data bus 49. In preparation for this event, the microprocessor 40 in FIG. 4 has converted the octal address to a binary address, and has added a least significant bit to distinguish between the address of the low byte in line 010 and the address of the high byte in line 010 of FIG. 5. This binary address is decoded by the decoder 55 in FIG. 4 to generate a signal on the SEN 0 line. The low byte from line 010 in the data table 41 is thus transferred to the I/O module 14 in the first I/O slot, assuming that this is an eight-bit I/O module of the prior art.

As seen in FIG. 1, the prior art label 32 provided bit designations 00-07 over the I/O module in the first I/O slot and 10-17 over the I/O module in second I/O slot. With the above-described scanning operation, the left slot in each I/O Module Group of the prior art transmits or receives a low byte of data and the right slot in each I/O Module Group of the prior art transmits or receives a high byte of data, depending on whether it is an input module or an output module.

Figure 8:
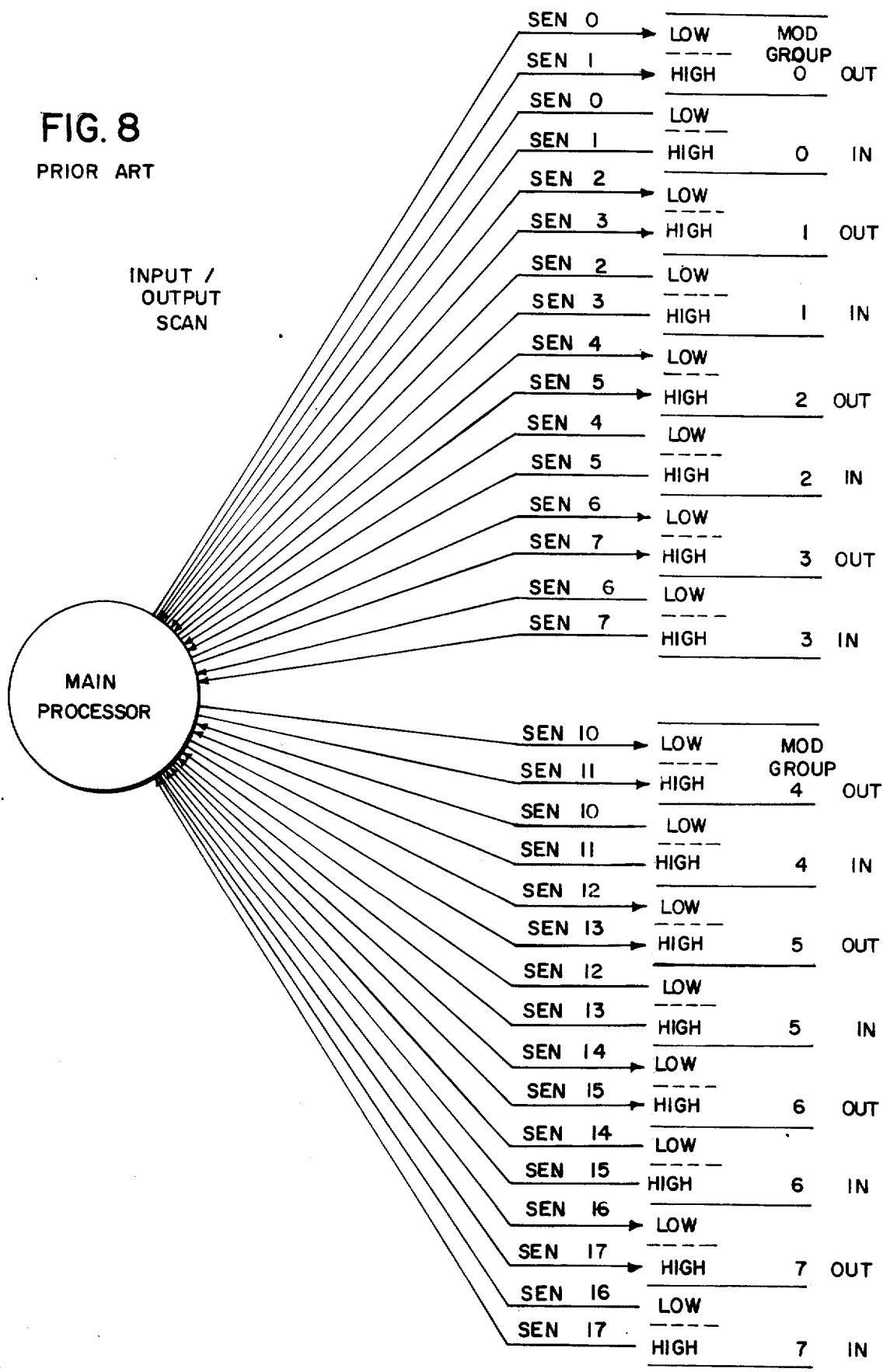
FIG. 8 is a schematic diagram of an I/O scanning operation performed by a prior art programmable controller.

The full I/O scanning operation of the prior art is seen in FIG. 8, where thirty-two SEN signals are sequentially generated. The full-size I/O rack 10' of FIG. 2 would include eight module groups designated from "0" to "7", each with a module in a "low byte" and a module in a "high byte" slot. The first two signals SEN 0 and SEN 1 are each generated with a WRITE signal. A low byte of output status data will be coupled to an output module in the "low byte" portion of the Module Group, and a high byte of output status data will be coupled to an output module in the "high byte" portion of the Module Group, provided these modules are present. If input modules are present in Module Group 0, input status data will be read from them when the SEN 0 and SEN 1 signals are generated a second time, each accompanied by a READ signal. It should now be more apparent that if an output module of the prior art is located in the "low byte" portion of the Module Group 0 for example, the generation of the SEN 0 signal with the READ signal will be an ineffective or "dummy" operation. It should also now be apparent that a corresponding line of memory in the input image table in FIG. 5 will not be used.

Figure 9:
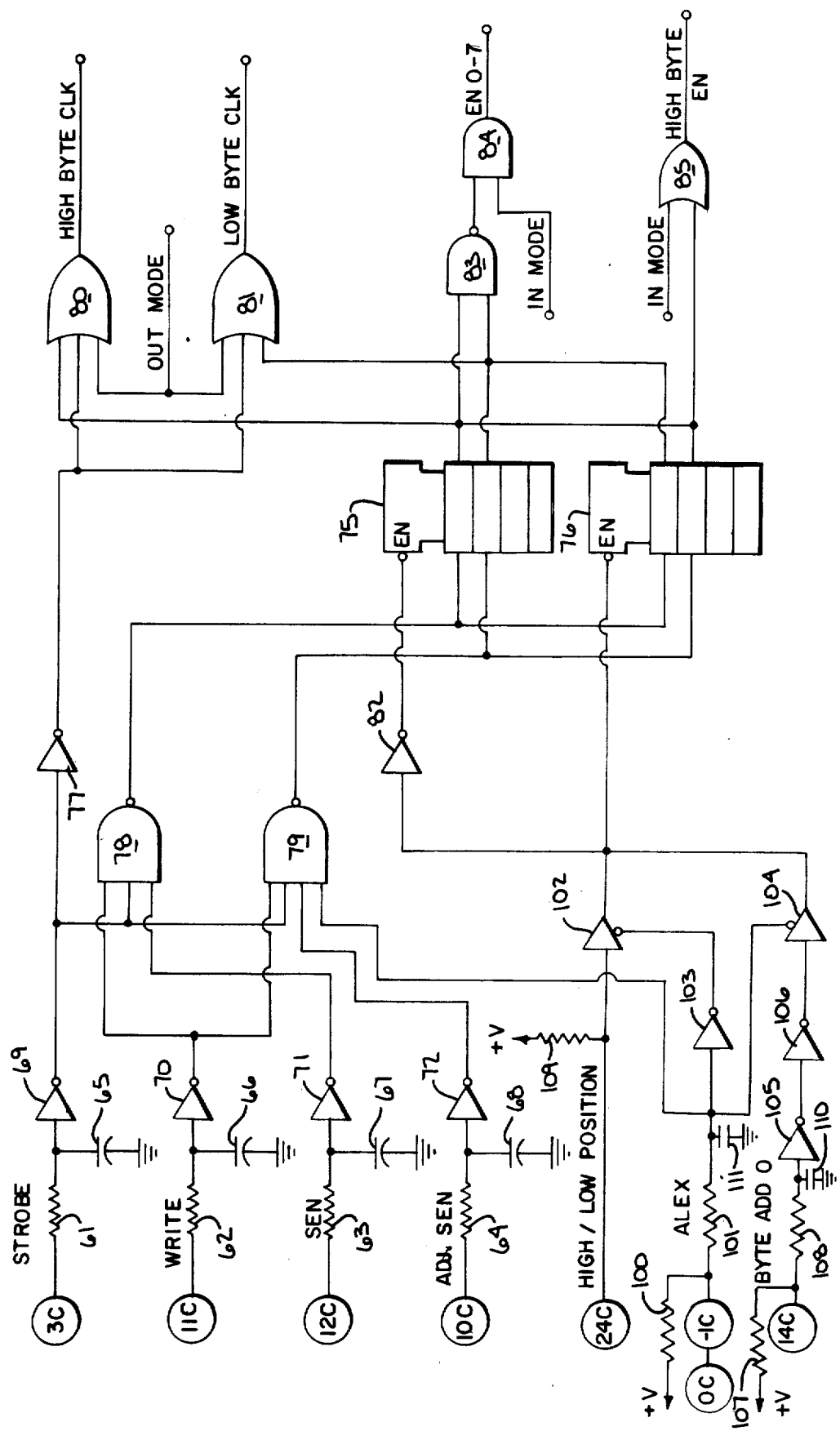
FIG. 9 is a detailed schematic of a portion of the backplane control logic circuit seen in FIG. 6.

To permit sixteen-bit capacity I/O modules 14 to be used in the same slots as the eight-bit I/O modules, modifications have been made to the backplane circuit board 13 seen in FIG. 7 and in the backplane control logic circuit 37a seen in FIGS. 6 and 9.

Looking first at FIG. 6, it will be seen that a second enable line ADJ SEN (adjacent slot enable) provides an additional enabling signal to the I/O module 14. The ADJ SEN signal is coupled through "pin 10C" on the I/O backplane connector. The second enabling signal allows a sixteen-bit output module, for example, to be enabled a second time during the output sequence. Thus, two bytes of output status data can be coupled to such an I/O module 14. To permit the I/O module 14 to respond to a second enabling signal, a new backplane logic circuit 37a has been provided as shown in FIG. 9.

As seen in FIG. 9, for a sixteen-bit output module, the STROBE, WRITE, SEN and ADJ SEN pins 3C, 11C, 12C and 10C, respectively, are connected through series resistors 61-64 and shunt capacitors 65-68 to filter out electrical noise that may be generated on the backplane circuit board 13. The control signals are next coupled through inverters 69-72 which invert the low-true logic signals. The STROBE line is also connected through a pull-up resistor (not shown) on the processor module 20 to a source of positive DC voltage, so that, in absence of a logic low signal at pin 3C, the STROBE line will remain at a logic high level. Another signal referred to as a HIGH/LOW POSITION signal is received at "pin 24C," which is pulled high through a resistor 74. The HIGH/LOW POSITION line connects "pin 24C" to the enable (EN) inputs on a pair of 4-gate buffers 75 and 76 with non-inverted outputs. The HIGH/LOW POSITION line is connected to the first buffer 75 through an inverter 77 so that either one, but not both, of the buffers 75 and 76 are enabled. Thus, the logic state of the HIGH/LOW POSITION line will select one of the buffers 75 and 76 for operation.

Also seen in FIG. 9 are a pair of NAND gates 78 and 79 which couple—in a logical sense—the WRITE line and the STROBE line with the ADJ SEN line and SEN line, respectively. The first gate 78 passes an active STROBE signal when it coincides with an active signal on the SEN line, while the second gate 79 passes an active STROBE signal when it coincides with an active signal on the ADJ SEN line.

The outputs of both gates 78 and 79 are connected to the first and second gates, respectively, in each set of buffers 75 and 76. The first and second gates of the first set of buffers 75 are connected to two three-input OR gates 80 and 81. The first and second gates of the second set of buffers 76 are connected to the same inputs on the OR gates 80 and 81, but their connections are reversed, so that the first gate of the buffers 75 and the second gate of the buffer 76 connect to an input on the first OR gate 80. Conversely, the second gate of the buffer 75 and the first gate of the buffer 76 connect to an input on the second OR gate. The other inputs to these OR gates 80 and 81 are provided by the STROBE line through a second inverter 82 and by an OUT MODE line, which is activated in this example to select operation of the backplane logic circuit 44 for an output module.

The function of the OR gates 80 and 81 is to provide a high byte clock (HIGH BYTE CLK) signal and a low byte clock (LOW BYTE CLK) signal to the data latches in circuit 37b in FIG. 6. The signals are generated sequentially so that first one byte of output status data, and then the other, is coupled through the I/O data bus 35 to the latching circuitry 37b. Whichever set of buffers 75 and 76 in FIG. 9 is enabled, the signal on the SEN line will generate one clock signal and the signal on the ADJ SEN line will generate the other clock signal. Thus, the I/O module 14 has been provided with a backplane logic circuit 37a with two enabling circuits in controlling relation to the data latching circuitry 37b.

For transfer of input status data, all four outputs of buffers 75 and 76 are connected to the inputs of a NAND gate 83, which has its output coupled through an AND gate 84 to the EN 0-7 line. Whenever the SEN line or ADJ SEN line is active, a low signal will be present at one of the inputs to the NAND gate 83. This will produce a logic high signal at its output, and a high-true signal on the EN 0-7 line, provided that the IN MODE line to gate 84 is active for an input mode of operation. An OR gate 85 controls the HIGH BYTE EN line in that same input mode. When buffers 75 are active, the OR gate 85 responds to the SEN signal to cause a high byte of input status data to be transmitted to the main processor, and when buffers 76 are active, the OR gate 85 responds to the ADJ SEN signal to cause a high byte of input status data to be transmitted to the main processor. The signal from pin 24C on the HIGH/LOW POSITION line determines which set of buffers 75, 76 is active, as will be explained in more detail below.

To provide the ADJ SEN enabling signal without altering the I/O scanning signals from the processor module 20, "pin 12C" in the left-hand slot of each Module Group in FIG. 7 has been cross-connected by an additional circuit path to "pin 10C" of the right-hand slot, and "pin 12C" in each right-hand slot has been cross-connected by an additional circuit path to "pin 10C" in the left-hand slot. These additional circuit paths provide the ADJ SEN lines, one of which is seen in FIG. 6.

Figure 10:
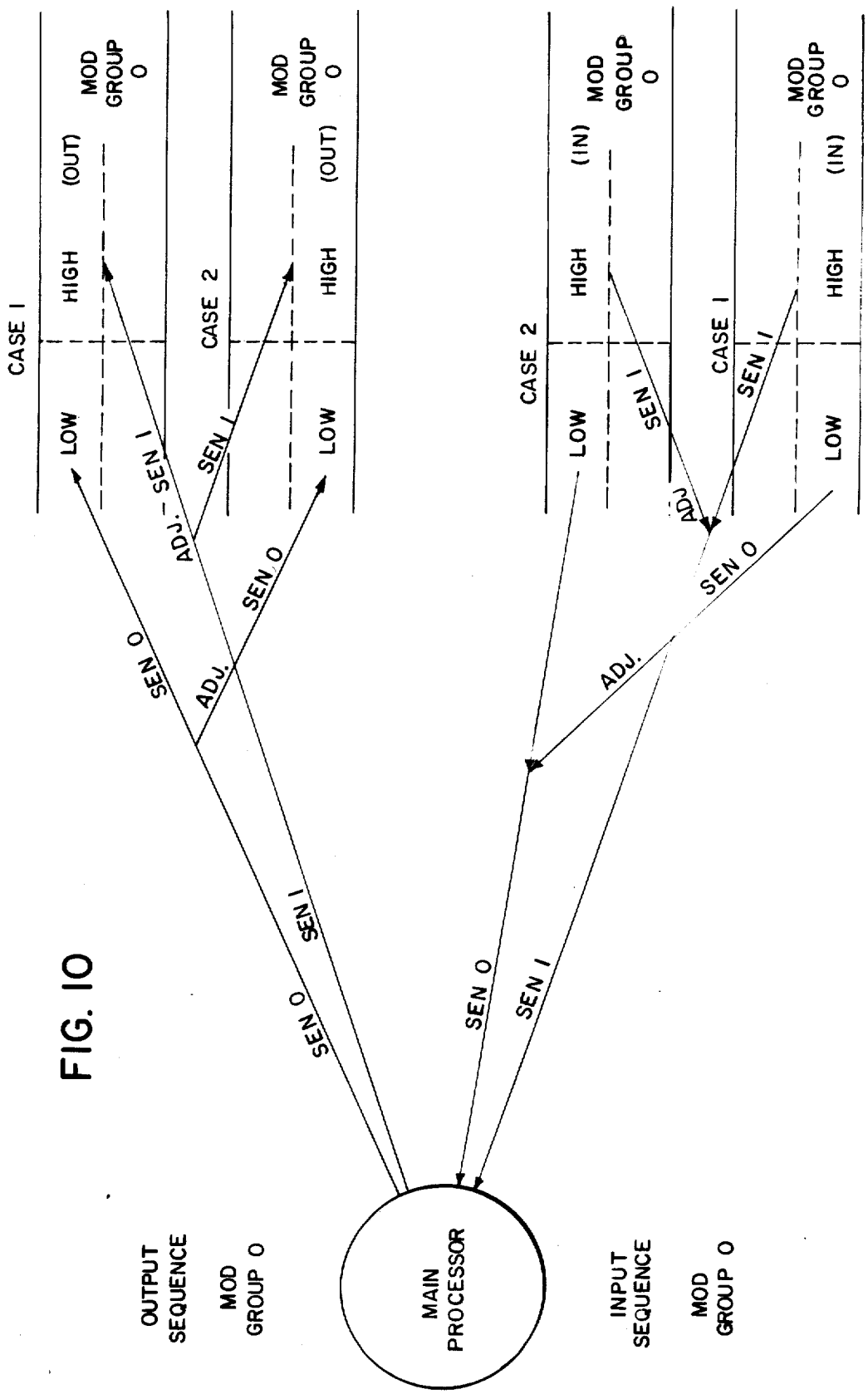
FIG. 10 is a schematic diagram of a first improved I/O scanning operation resulting from the invention.

This has the effect of altering the I/O scanning operation as seen in the arrangement of I/O modules referred to as Case 1 in FIG. 10. During the output sequence for Module Group 0, a signal on the SEN 0 line will still result in the coupling of a "low byte" of output status data to an output module in the "low byte" slot. When, however, the SEN 0 signal is generated during the input sequence, a "low byte" of input data can be coupled from an input module in the adjacent slot, because the SEN 0 signal is received at "pin 10C" in the adjacent slot in the form of the ADJ SEN 0 signal. With an input module in the adjacent slot, the coupling of the SEN 1 signal during the output sequence would previously have been a "dummy" operation. But now, this signal is coupled to "pin 10C" in the first slot in the form of the ADJ SEN 1 signal to allow a "high byte" of output status data to be received by the output module in what was previously the "low byte" portion of the Module Group 0. A "high byte" of input status data is transferred when the SEN 1 signal is generated during the input sequence.

In the same amount of time and with the same enabling signals from the processor module 20, the amount of I/O status data transferred to and from Module Group 0 has doubled. This allows the use of sixteen-bit capacity I/O modules in the same slots occupied by eight-bit modules. In fact, an eight-bit module can be paired with a sixteen-bit module in a Module Group, so long as one is an input module and the other is an output module. With the invention the principle that any individual slot will accommodate either an input module or an output module is preserved.

As seen in FIG. 10, an output module can be switched from the left (Case 1) to the right (Case 2) position of Module Group 0 and the input module can be switched from the right (Case 1) to the left (Case 2) portion of Module Group 0. The only limitation is that where a double capacity I/O module is used, it must be complemented in its Module Group by a module that communicates status data in an opposite direction.

This is illustrated in FIG. 1 by a new label 33a to be used with the I/O modules 14 of the invention. In the left slot of Module Group 0 is an output module symbolized by a "0", and this module 14 has sixteen output circuits with I/O addresses 00-17 (octal). In the right slot of Module Group 0 is an input module symbolized by an "I", and this module 14 has sixteen input circuits with I/O addresses 00-17 (octal).

Another result of the invention is seen in FIG. 5. If two complementary sixteen-bit I/O modules 14 are used in Module Group 0, both lines 010 and 110 in the data table will be utilized, whereas in prior art equipment, one of these lines of memory would remain unused.

Referring again to FIG. 7, it should be noted that "pin 24C" in the left slot for each Module Group is connected to a line that connects "pin 23C" in every slot to ground. "Pin 24C" in the right slot, however, is left unconnected. These connections provide either a high or low logic signal at "pin 24C" seen in FIG. 9.

If "pin 24C" in FIG. 9 is grounded when the I/O module 14 is in a left slot, a logic low signal enables the lower set of buffers 76 in FIG. 9. A SEN signal will then control the generation of the pulse through NAND gate 78, buffers 76 and OR gate 81. The ADJ SEN will then control the generation of the HIGH BYTE CLK pulse through NAND gate 79, the buffers 76 and the OR gate 80. If "pin 24C" in FIG. 7 is left at a logic high as when the I/O module 14 is in a right slot, the logic high signal is inverted to enable the upper set of buffers 75 in FIG. 9. A SEN signal will then control the generation of the HIGH BYTE CLK signal through the NAND gate 78, buffers 75 and OR gate 80. The ADJ SEN signal will then control the generation of the LOW BYTE CLK signal through the NAND gate 79, buffer 75 and the OR gate 81. This is done to assure that bytes are sent and received in the correct order relative to the high byte and low byte of status data in the data table 41 of FIG. 5.

The limitation of complementary placement of I/O modules is eliminated, and the potential for higher density I/O modules is provided, with additional modifications that have been made to the backplane of FIG. 7 and the backplane logic circuit of FIG. 9. These modifications involve the ALEX line and the BYTE ADDRESS 0 line.

Figure 11:
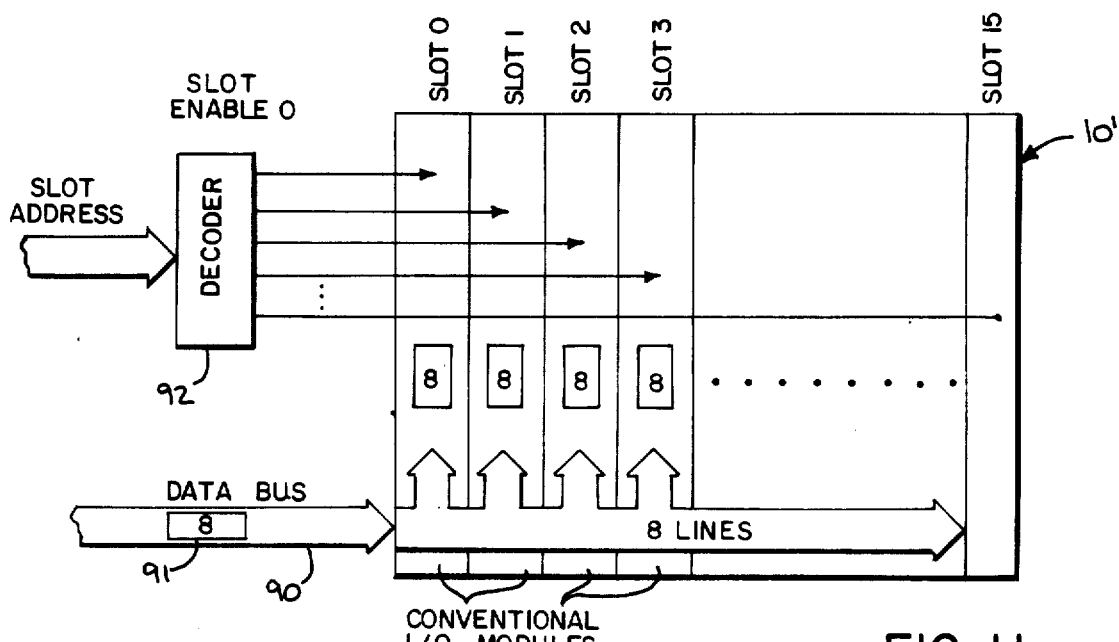
FIG. 11 is a schematic diagram of the prior art method of I/O scanning.
Figure 12:
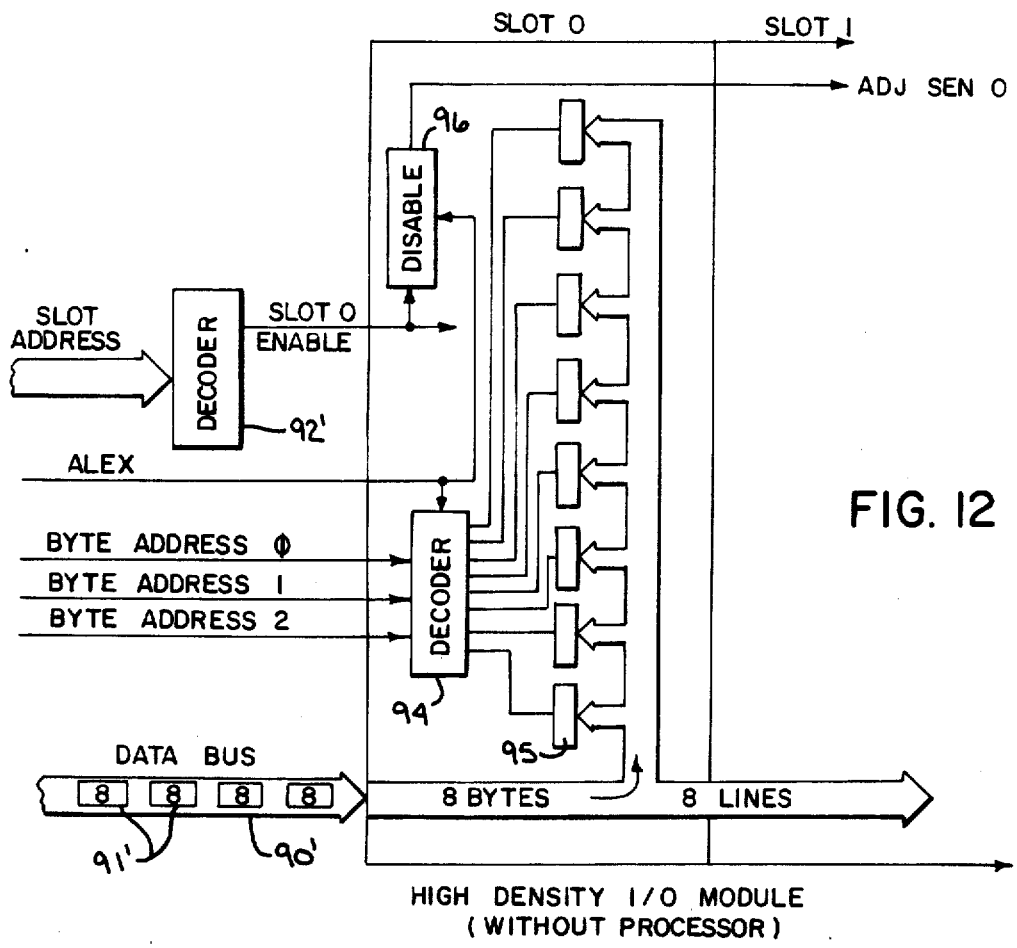
FIG. 12 is a schematic diagram of a second improved method of I/O scanning.

To explain the second method of I/O scanning provided by the invention, reference is made to FIGS. 11 and 12. FIG. 11 is a schematic showing the scanning technique of the prior art. Slot addresses are decoded using a decoder 92 external to the I/O modules, and slot enable lines run across the backplane to respective slots 1-15. The data bus 90 is eight bits wide, and a single byte 91 of data is transferred through this bus to or from each slot. I/O density is eight bits per slot and 128 bits per 16-slot rack 10'.

Referring now to FIG. 12, with the addition to the backplane of three lines, referred to as BYTE ADDRESS lines, eight bytes 91' of data can be transferred to or from an I/O module in each slot, raising I/O density to 64 bits per slot and 1024 bits per 16-slot rack. The term "without processor" in FIG. 12, refers to the fact that higher density is achieved for I/O modules without the addition of a microprocessor. To accomplish this, the ALEX line is added to the backplane to enable a decoder 94 or other circuit which couples the BYTE ADDRESS signals to latching circuitry 95 on the I/O module. The ALEX line allows operation of the I/O modules with existing processors that can utilize the first new scanning technique discussed herein, and with new processors or adapter modules that can signal byte addresses as well as slot addresses. The ALEX line is connected to a DISABLE circuit 96 to disable the ADJ SEN lines when byte addresses are available. This is to prevent both scanning techniques from inadvertently being used at the same time.

When an existing processor is used, the ALEX line will not be active and the ADJ SEN lines will remain active. When a modified processor, as described herein, is used, it reads the dip switch (DSW) in FIG. 4 to activate the ALEX line and disable the ADJ SEN lines. The microprocessor 40 responds to the detection of the ALEX signal to alter its scanning routine and to generate the BYTE ADDRESS signals. If the ALEX signal is not detected, the microprocessor 40 executes I/O scanning instructions of the type used in existing processors not providing the ALEX function.

On the I/O module, the scanning technique is effected by the circuit in FIG. 9. The ALEX line is first connected to a pull-up resistor 100, and then through a series resistor 101 to a shunt capacitor 111 and to a fourth input on the NAND gate 79. When the ALEX signal is active it disables gate 79 to decouple the ADJ SEN signal from the buffers 75 and 76. The ALEX signal is also used to disable the HIGH/LOW POSITION input by disabling gate 102 through an inverter 103. The input of gate 102 is pulled high through resistor 109. At the same time gate 102 is disabled, the ALEX signal enables gate 104 so that the BYTE ADDRESS 0 line then controls enabling of the buffers 75, 76 through pull-up resistor 107, series resistor 108, filtering capacitor 110, inverters 105, 106 and gate 104. The BYTE ADDRESS 0 signal then enables one of the buffers 75, 76 to initiate transfer of a first byte of status data, and it then changes its binary state to enable the other of the buffers 75, 76 to initiate transfer of the second byte of status data. In the circuit shown in FIG. 9, only the BYTE ADDRESS 0 line has been added because only sixteen-bit I/O modules are illustrated in FIG. 1. It should be appreciated, however, that the second method of I/O scanning is applicable to modules of greater density using binary-coded BYTE ADDRESS lines "1" and "2".

The circuitry in FIG. 9 is preferably part of a custom LSI integrated circuit seen in FIG. 4. For a discussion of the manufacture of this circuit reference is made to the copending application of Maskovyak et al entitled "Double Density I/O Modules with Universal Components". Alternatively, the circuit can be made with the commercially available CMOS technology circuit packages listed in Table 1 below. These are available from National Semiconductor Corp. of Santa Clara, Calif., and a number of other well-known sources for standard CMOS circuits.

TABLE 1

| Component | COMPONENT LISTING Ref. Nr. | Description |
|---|---|---|
| Inverters | 69-72, 77, 82, 103, 106 | CD4049B hex inverting buffer gates |
| Inverter | 105 | 74C914 inverting buffer gate |

TABLE 1-continued

| Component | COMPONENT LISTING Ref. Nr. | Description |
|---|---|---|
| Buffer gates | 75, 76, 102, 104 | 74C244 octal buffer/line drivers with noninverted outputs |
| NAND gates | 78, 79 | CD4012B dual four-input NAND gates |
| NAND gate | 83 | CD4011B quad two-input NAND gates |
| OR gates | 80, 81 | CD4075B triple three-input OR gates |
| OR gate | 85 | CD4071B quad two-input OR gate |
| AND gate | 84 | CD4081B quad two-input NAND gate |

Having described in detail a preferred embodiment of the invention, the following claims are made to its methods and apparatus.

I claim:

1. A method of communicating bytes of data over a single-byte data bus in a programmable controller between a processor and two I/O modules, one of which is an output module, and one of which is an input module, wherein the processor transmits a first write signal and a first enable signal to the output module, wherein the processor transmits a second write signal and a second enable signal to the input module, wherein said first write signal is transmitted to both the input module and the output module, and wherein said second write signal is transmitted to both the input module and the output module, the method comprising:

the output module receiving and responding to said first write signal and said first enable signal from the processor to receive a first byte of data from the processor;

extending the transmission of said second enable signal from the input module to the output module; and the output module receiving and responding to said second write signal and said second enable signal from the processor to receive a second byte of data from the processor.

2. A method of communicating bytes of data over a single-byte data bus in a programmable controller between a processor and two I/O modules, one of which is an output module, and one of which is an input module, wherein the processor transmits a first read signal and a first enable signal to the input module, wherein the processor transmits a second read signal and a second enable signal to the output module, wherein said first read signal is transmitted to both the input module and the output module, and wherein said second read signal is transmitted to both the input module and the output module, the method comprising:

the input module receiving and responding to said first read signal and said first enable signal from the processor to transmit a first byte of data to the processor;

extending the transmission of said second enable signal from the output module to the input module; and the input module receiving and responding to said second read signal and said second enable signal from the processor to transmit a second byte of data to the processor.

3. An I/O module for transmitting or receiving I/O status data on a data bus shared by a related I/O module, wherein the related I/O module is coupled to the data bus in response to receiving an enable signal through a related I/O module enable line and in response to receiving a first control signal that determines a first direction of data transfer on the data bus, the first-mentioned I/O module comprising:

- data latching circuitry for holding at least two bytes of I/O status data;
- a first enabling circuit connected for enabling the data latching circuitry to receive a byte of data, the first enabling circuit being connected during operation to a first enable line to receive a first enabling signal and the first enabling circuit being responsive to the first enable signal and to a second control signal that determines a second direction of data transfer on the data bus to enable a first byte of I/O status data to be exchanged between the data bus and the data latching circuitry; and
- a second enabling circuit connected for enabling the data latching circuitry to receive a byte of data, the second enabling circuit being connected during operation to the related I/O module enable line to receive a second enabling signal and the second enabling circuit being responsive to the second enabling signal and to a second occurrence of said second control signal to enable a second byte of I/O status data to be exchanged between the data bus and the data latching circuitry.

4. The invention of claim 3, in which the I/O module is an input module and in which the first and second enabling circuits each have means for receiving a read signal in addition to their respective enabling signals.

5. The invention of claim 3, in which the I/O module is an output module and in which the first and second enabling circuits each have means for receiving a write signal in addition to their respective enabling signals.

6. In a programmable controller equipment rack for supporting input and output modules, a backplane circuit board which forms a data bus, and which forms enabling lines that carry enabling signals to slot positions where respective input and output modules are enabled for communication with the data bus, wherein each enabling line carries a plurality of enabling signals during an input/output scanning operation, and wherein an improvement in the backplane circuit board comprises:

- a first circuit path that extends a first enabling line from a first slot position to a second slot position, wherein a first input/output module in the first slot position is enabled for communication of data by a first enabling signal carried by the first enabling line during the input/output scanning operation and wherein a second input/output module in the second slot position is enabled for communication of data by a second enabling signal carried by the first enabling line and the first circuit path during the input/output scanning operation; and
- a second circuit path that extends a second enabling line from the second slot position to the first slot position, wherein the second input/output module is enabled for communication of data by a third enabling signal carried by the second enabling line during the input/output scanning operation and wherein the first input/output module is enabled for communication of data by a fourth enabling signal carried by the second enabling line and the second circuit path during the input/output scanning operation.

7. The backplane circuit board of claim 6, wherein the first slot position is adjacent to the second slot position.

8. A method of communicating two bytes of I/O status data over a byte-wide data bus between a backplane circuit board in a programmable controller and an I/O module, the method comprising:

- the I/O module receiving a first I/O module enable signal that has been decoded off the I/O module and routed through the backplane circuit board to the I/O module and the I/O module receiving a first byte address that has been routed through the backplane circuit board, and then, the I/O module receiving a second I/O module enable signal that has been decoded off the I/O module and routed through the backplane circuit board to the I/O module and the I/O module receiving a second byte address taht has been routed through the backplane circuit board;
- communicating a first byte of I/O status data over the data bus in response to the I/O module receiving the first I/O module enable signal and the first byte address;
- communicating a second byte of I/O status data over the data bus in response to the I/O module receiving the I/O module enable signal and the second byte address; and
- the I/O module receiving a control signal that enables a byte address means in the I/O module for receiving and decoding the first and second byte addresses.

9. The method of claim 8, wherein when the control signal is inactive, the byte address means is disabled, and the I/O module receives and responds to the first I/O module enable signal to communicate a first byte of I/O status data, but is not responsive to the first and second byte addresses.

10. The method of claim 8, wherein:

- the I/O module receives a third I/O module enable signal and wherein the I/O module receives a third byte address; and
- further comprising the step of communicating a third byte of I/O status data over the data bus in response to the I/O module receiving the third I/O module enable signal and the third byte address.

11. An I/O module for communicating two bytes of I/O status data with an I/O scanning means in a programmable controller through a byte-wide data bus formed in a backplane circuit board, the I/O module comprising:

- first means for receiving first and second I/O module enable signals that are decoded from an individual I/O module address that is transmitted twice by the I/O scanning means, the I/O module enable signals being routed through the backplane circuit board;
- second means on the I/O module for receiving and decoding first and second byte addresses transmitted by the I/O scanning means and received through the backplane circuit board;
- third means for receiving an enabling signal from the backplane circuit board to enable the second means to receive and decode the first and second byte addresses;
- fourth means coupled to the first and the second means for enabling a first byte of I/O status data to be communicated over the data bus in response to the I/O module receiving a first I/O module enable signal and the first byte address; and
- fifth means coupled to the first and second means for enabling a second byte of I/O status data to be communicated over the data bus in response to receiving the first I/O module enable signal and the second byte address.

* * * * *

UNITED STATES PATENT AND TRADEMARK OFFICE
CERTIFICATE OF CORRECTION

PATENT NO.  : 4,691,296

DATED       : September 1, 1987

INVENTOR(S) : Odo J. Struger

It is certified that error appears in the above-identified patent and that said Letters Patent is hereby corrected as shown below:

Column 3, line 3, after "of data" the second phrase 'of data' should be eliminated.

Column 4, line 64, "or" should be --of--.

Column 6, line 68, "alterntion" should be --alteration--.

Column 7, line 24, "Write" should be --WRITE--.

Column 7, line 46, "he" should be --the--.

Column 7, line 52, "pump" should be --jump--.

Column 18, line 14, "taht" should be --that--.

Signed and Sealed this

Twelfth Day of January, 1988

Attest:

DONALD J. QUIGG

*Attesting Officer*     *Commissioner of Patents and Trademarks*